US006532411B2

(12) United States Patent
Manaka et al.

(10) Patent No.: US 6,532,411 B2
(45) Date of Patent: Mar. 11, 2003

(54) BRAKE BOOSTER CONTROL DEVICE AND METHOD OF CONTROLLING THE SAME

(75) Inventors: Toshio Manaka, Hitachinaka (JP); Satoru Kuragaki, Hitachi (JP); Tokuji Yoshikawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/941,652

(22) Filed: Aug. 30, 2001

(65) Prior Publication Data

US 2002/0133284 A1 Sep. 19, 2002

(30) Foreign Application Priority Data

Feb. 7, 2001 (JP) ........................................ 2001-030796
Mar. 15, 2001 (JP) ........................................ 2001-073277

(51) Int. Cl.[7] ................................................ G06F 7/76
(52) U.S. Cl. ............................ 701/70; 701/78; 701/83; 303/155
(58) Field of Search ............................... 701/70, 78, 83, 701/85; 60/550, 551; 303/155

(56) References Cited

U.S. PATENT DOCUMENTS 5,992,947 A * 11/1999 Tsubouchi .............. 303/114.3
6,282,896 B1 * 9/2001 Wachi et al. .............. 60/547.2

FOREIGN PATENT DOCUMENTS

| DE | 197 44 053 C1 | 10/1998 |
| EP | 0 901 948 A1 | 3/1999 |
| FR | 2 792 898 | 11/2000 |
| JP | 2000289592 | 10/2000 |

* cited by examiner

*Primary Examiner*—Gertrude Arthur
(74) *Attorney, Agent, or Firm*—Crowell & Moring LLP

(57) ABSTRACT

In order to judge whether a driver has pressed a brake pedal, a stroke sensor and a brake pedal pressing force sensor had to be installed in a conventional vehicle brake control device which required a complex attachment structure and time for attachment work and for attachment position adjusting work of the sensors. In the present brake booster control device, based on at least one of when an output (master cylinder pressure) larger by a predetermined amount than an output (master cylinder pressure Pr) expected from a current applied to the solenoid 6 in the brake booster 4 is obtained, when an output (master cylinder pressure) larger by a predetermined amount than a control target output (target master cylinder pressure) is obtained and when an output variation larger by a predetermined amount in an increasing direction than a variation component of the control target output (target master cylinder pressure) is obtained, it is judged that the driver has pressed the brake pedal.

8 Claims, 7 Drawing Sheets

BRAKE BOOSTER CONTROL DEVICE AND METHOD OF CONTROLLING THE SAME

BACKGROUND OF THE INVENTION

1. Field of the Invention

The present invention relates to a brake device for a vehicle and, in particular, relates to a brake booster control device in a brake device and a method of controlling the same.

2. Conventional Art

JP-A-2000-289592, for example, discloses a pressurized booster controlled by a microcomputer provided with a stroke sensor for detecting a control amount of a brake pedal and a brake pedal pressing force sensor and further discloses a brake control device for a vehicle provided with braking judgement means for judging brake pedal pressing by a driver based on the operating condition of these sensors.

However, in the brake control device for a vehicle disclosed in JP-A-2000-289592, there was a problem that such as the stroke sensor for detecting a control amount of a brake pedal and the brake pedal pressing force sensor have to be installed. Accordingly, there arose problems that time for attaching these sensors and for attachment position adjustment and a complex structure for the attachment are additionally required.

SUMMARY OF THE INVENTION

The present invention is achieved in view of the above problems and an object of the present invention is to provide a brake booster control device and a method of controlling the same which can judge whether a driver has pressed a brake pedal without installing a special sensor such as a stroke sensor and a brake pedal pressing force sensor.

Namely, a brake booster control device according to the present invention which achieves the above object includes a function of judging that a driver has pressed a brake pedal based on at least one of the following information is obtained, in that when an output (a master cylinder pressure) lager by a predetermined amount than an output (master cylinder pressure) which is expected from a control amount applied to a control valve is obtained, when an output larger by a predetermined amount than a control target output (target master cylinder pressure) is obtained and when an output variation larger in its increasing direction by a predetermined amount than a variation component of a control target output (target master cylinder pressure) is obtained, thereby, a provision of the stroke sensor and the brake pedal pressing force sensor is eliminated. As a result, the structure of a booster is simplified and the attachment work and the attachment position adjustment work of the stroke sensor and the brake pedal pressing force sensor are also eliminated.

DESCRIPTION OF THE PREFERRED EMBODIMENT

Figure 1:
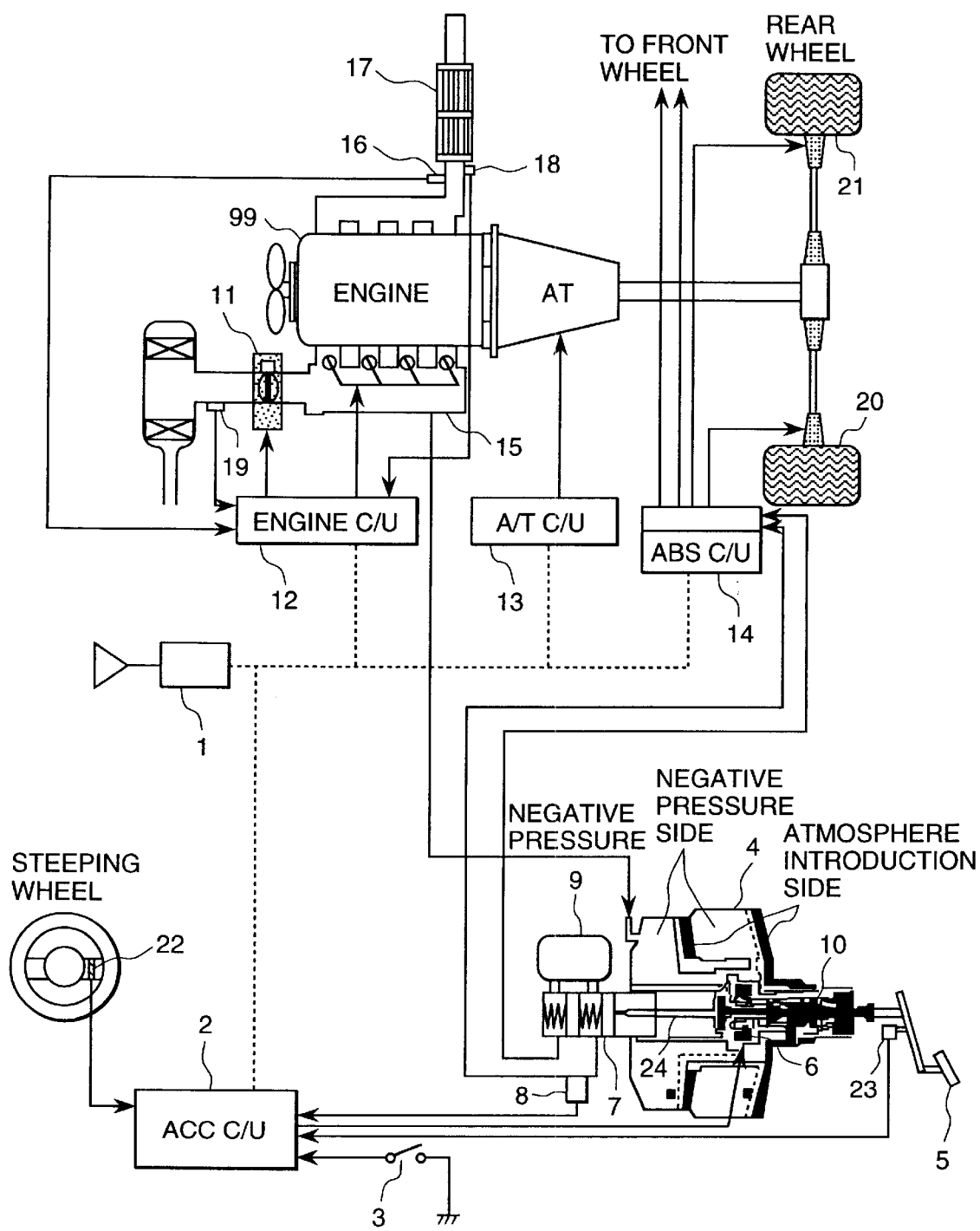
FIG. 1 is a constitutional diagram showing one embodiment of a brake booster control device according to the present invention.

FIG. 1 is a constitutional diagram showing one embodiment of a brake booster control device according to the present invention.

Information of intercar distance and relative speed from a car ahead and yaw rate of own car are sent from a laser radar 1 via a communication line (shown by dotted lines in the drawing) to an ACC control unit 2, and based on these information the ACC control unit 2 adjusts an output of an engine 99 and feed-back controls the own car at a predetermined vehicle speed. Namely, if the intercar distance from the car ahead decreases below a predetermined distance, the ACC control unit 2 applies a current to a solenoid (electromagnetic valve) 6 in a brake booster 4 and effects an automatic braking so as to keep a predetermined intercar distance.

The braking strength can be determined by detecting the master cylinder pressure by a pressure sensor 8. When a current is applied to the solenoid (electromagnetic valve) 6, a valve 10 is opened and atmospheric air is introduced into the booster, and a pressure difference with a negative pressure introduced into the brake booster 4 from an engine intake manifold 15 is caused and an output rod 24 pushes in a piston of a master cylinder 7. As a result, a raised master cylinder pressure is introduced to brake calipers for front and rear wheels via an ABS unit 14, and brake pads push brake discs to actuate the brake.

An engine control unit 12 controls an electrically controlled throttle valve 11 based on a target request command being transmitted from the ACC control unit 2 via the communication line to thereby increase or decrease the engine output.

An AT control unit 13 is for controlling gear positions of an automatic transmission and is designed to send information of the vehicle speed of the own car and the AT gear position to the ACC control unit 2 via the communication line. Thereby, the ACC control unit 2 can perform a vehicle speed control (automatic cruise) and an intercar distance follow up control. Herein, the vehicle speed control (automatic cruise) implies to control the own car at a vehicle speed set by a driver, and the intercar distance follow up control implies to maintain and control the intercar distance at a predetermined distance when a car ahead travels at a slower speed than the vehicle speed set for the own car and the intercar distance is shortened.

When the valve 10 is opened after a current is applied to the solenoid 6 in the brake booster 4, at the same time when the output rod 24 pushes the piston in the master cylinder 7, a brake pedal 5 is moved together, and a brake lamp switch 23 is pushed to cause ON state. Even when the driver presses the brake pedal 5 under a condition of applied current of 0A, the lamp switch 23 is turned ON by the pushing action. During the time when a current is applied to the solenoid 6, the brake lamp switch 23 is always kept at ON state, under such state if the driver presses the brake pedal 5, the valve 10 is pushed open, the output rod 24 pushes in the piston and the master cylinder pressure is further raised. Through the detection of the pressure variation, it is judged that the driver has pressed the brake pedal 5 and the vehicle speed control (automatic cruise) and the intercar distance follow-up control can be released (ended).

Figure 2:
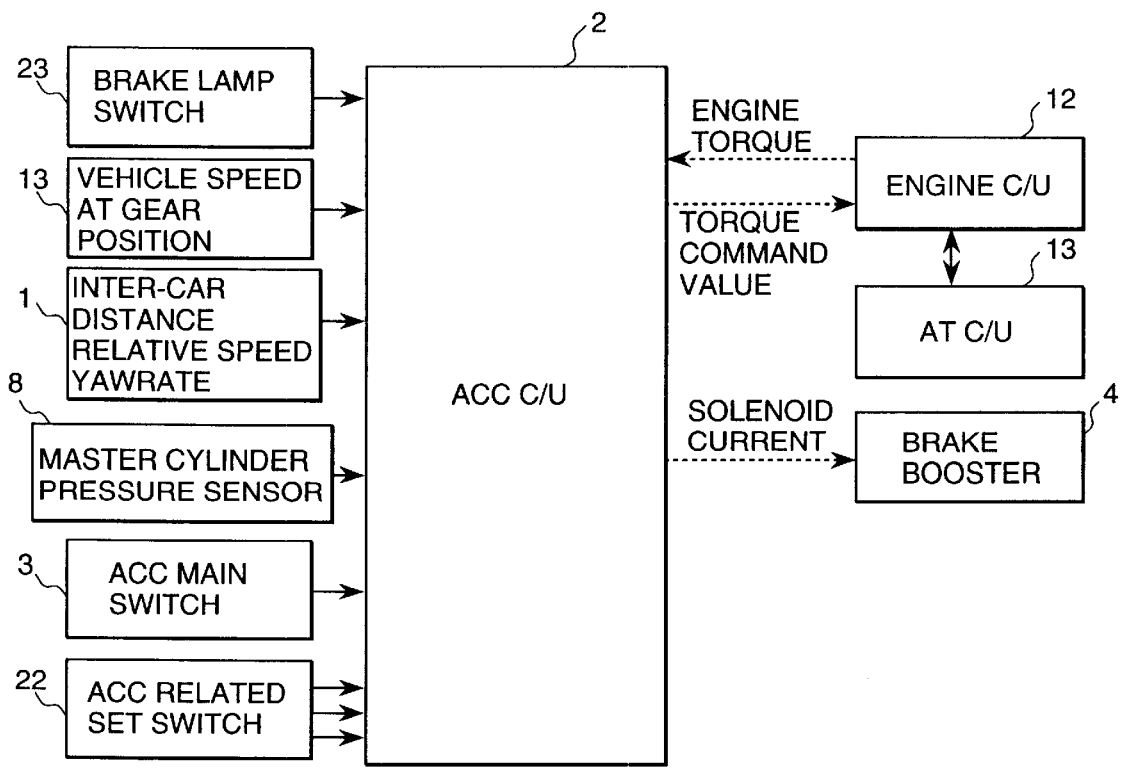
FIG. 2 is a control block diagram of an ACC control unit in FIG. 1.

FIG. 2 is a control block diagram of the ACC control unit 2. To the ACC control unit 2 information and signals of the brake lamp switch 23, vehicle speed and AT gear position 13 of the own car, intercar distance and relative speed with a car ahead and yaw rate 1, master cylinder pressure sensor 8, an ACC main switch 3 and an ACC relating set switch 22 are input via such as the communication line (as shown by dotted lines in the drawings) and wirings. Based on these information and signals the ACC control unit 2 transmits a torque command value to the engine control unit 12, thereby, the engine output is adjusted and the vehicle speed is controlled at the vehicle speed set by the driver. When an intercar distance is shortened from a predetermined distance because of a slow car ahead, a current is applied to the solenoid 6 in the brake booster 4 as shown in FIG. 1 to effect an automatic braking. Thereby, the intercar distance is kept constant. The engine control unit 12 controls the engine output at the torque command value as well as transmits information necessary for the position control to the AT control unit 13. The ACC main switch 3 as shown in FIG. 1 is a main switch for activating the vehicle speed control (automatic cruise) and the intercar distance follow-up control, however, the controls do not started only by this means. The switching for the control start and the vehicle speed setting are performed when the driver manipulates the ACC related set switch 22 provided at the steering wheel.

Figure 3:
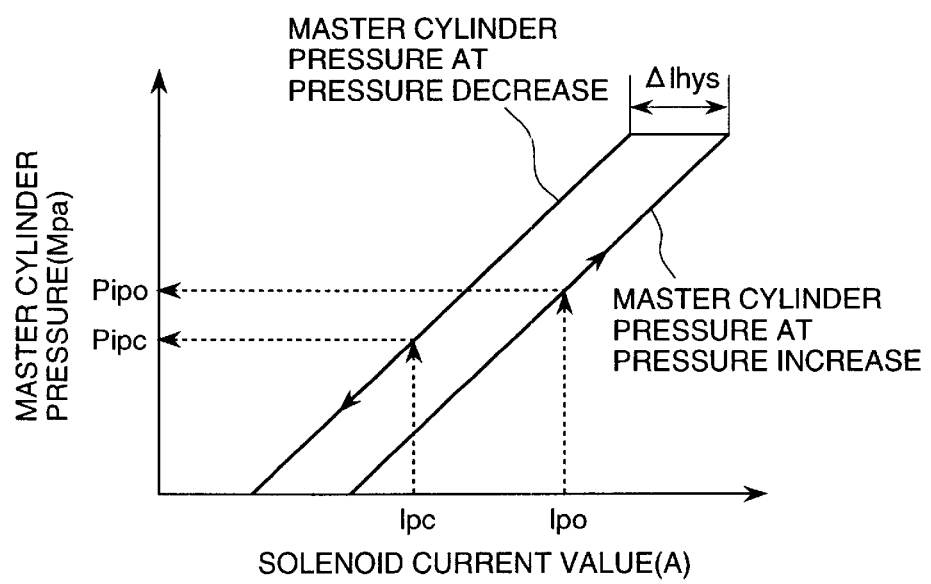
FIG. 3 is a diagram showing a relationship between solenoid current and master cylinder pressure in a brake booster in FIG. 1.

FIG. 3 shows a relationship between solenoid current and master cylinder pressure in the brake booster 4. When the applied current increases, atmospheric air introduced from the valve 10 into the brake booster 4 increases, as a result, a pressure difference with the negative pressure side increases, thereby, the output rod 24 pushes in the piston of the master cylinder to increase the master cylinder pressure. For example, when solenoid current is Ipo(A), the master cylinder pressure assumes at Pipo (MPa). When decreasing pressure, through decreasing the current the atmospheric air to be introduced into the brake booster 4 is decreased to reduce the differential pressure with the negative pressure side, thereby, the output rod 24 returns and the master cylinder pressure decreases. At this moment, since there occurs a hysteresis due to frictions at the sliding portions of the solenoid 6 and the valve 10, the solenoid current at the time of pressure decreasing shows a shifting characteristic by a component of $\Delta$Ihys. For example, when the solenoid current is Ipc(A), the master cylinder pressure assumes Pipc.

Figure 4:
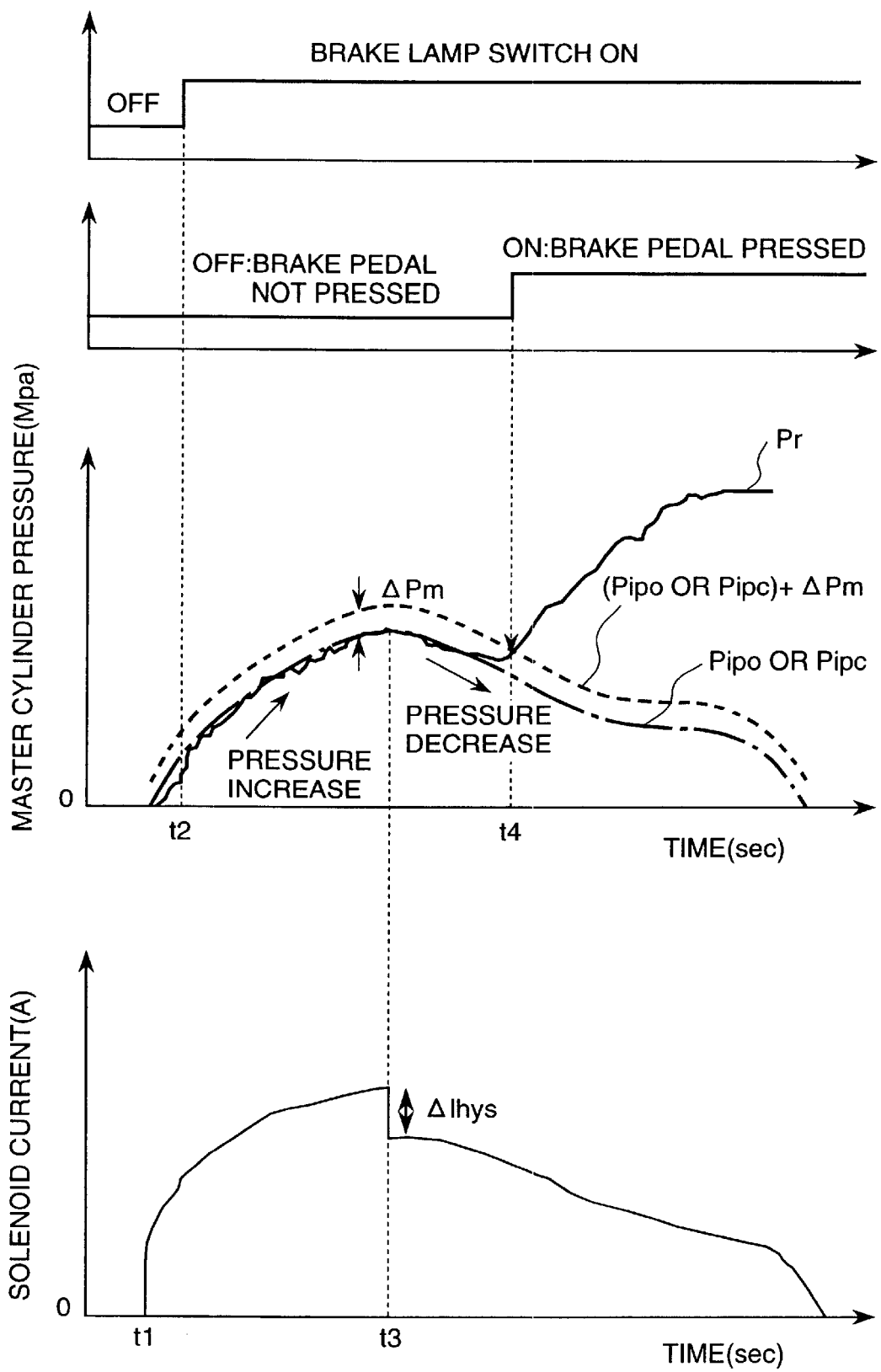
FIG. 4 is a diagram for explaining an operation in the embodiment according to the present invention.
Figure 5:
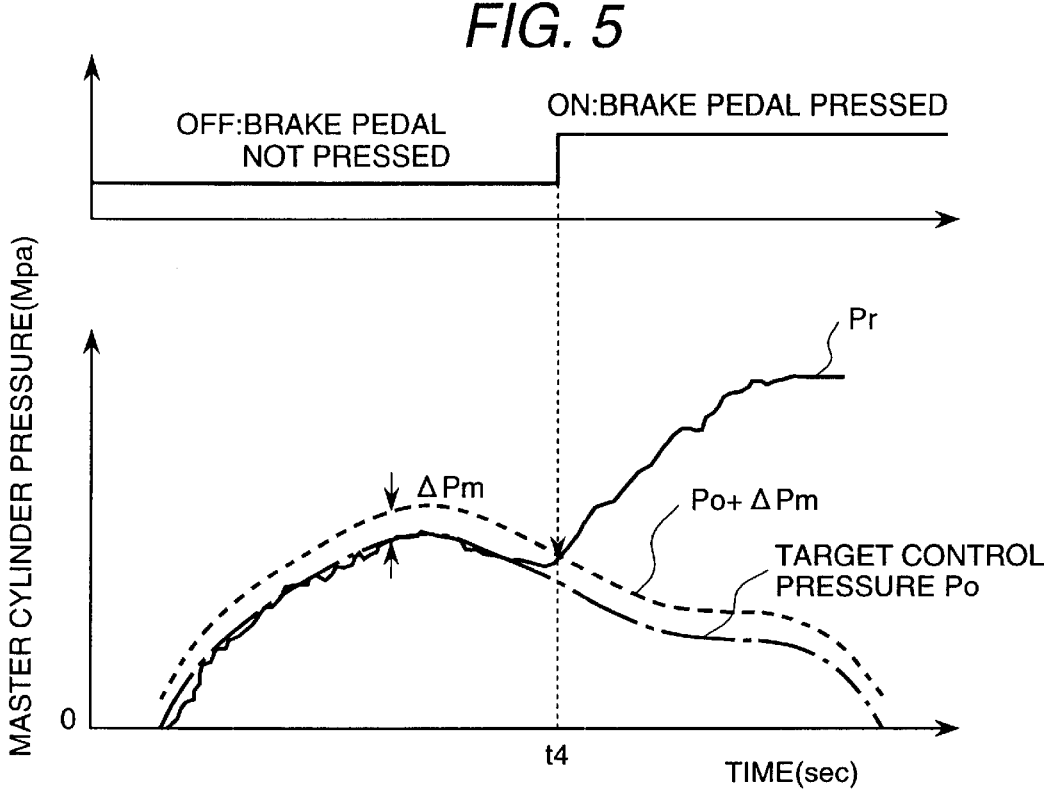
FIG. 5 is a diagram for explaining another operation in the embodiment according to the present invention.
Figure 6:
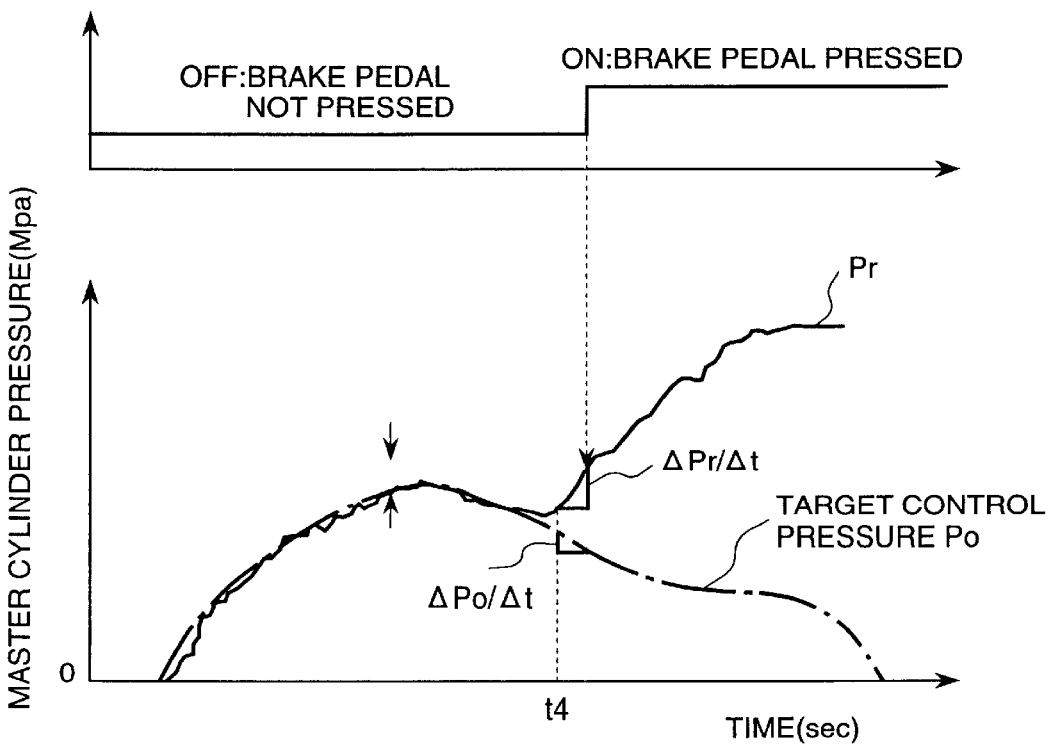
FIG. 6 is a diagram for explaining still another operation in the embodiment according to the present invention.

FIGS. 4, 5 and 6 are diagrams for explaining operations of the present embodiment according to the present invention.

In FIG. 4, when the applying current from the ACC control unit 2 begins to increase at time t1, the brake pedal 5 pushes the brake lamp switch 23 at time t2 to change the state thereof from OFF to ON. Since the master cylinder pressure Pr switches from increasing to decreasing at time t3, the solenoid current decreases by the component of $\Delta$Ihys. Based on these solenoid current values and the characteristic as shown in FIG. 3 an expected master cylinder pressure Pipo or Pipc is calculated (one dot and chain line) and a value (dotted line) determined by adding a predetermined value $\Delta$Pm to the calculated value is obtained. When the driver presses the brake pedal 5 at time t4, the master cylinder pressure Pr rises independent from the solenoid current value and exceeds the value ((Pipo or Pipc)+predetermined value $\Delta$Pm), and at this moment it is detected that the driver has pressed the brake pedal 5. As a result, the ACC control unit 2 can release (end) the vehicle speed control (automatic cruise) and the intercar distance follow-up control.

FIG. 5 shows another control using a control target pressure Po calculated in the ACC control unit 2 instead of the expected master cylinder pressure determined based on the solenoid current as explained in connection with FIG. 4. When the driver presses the brake pedal 5 at time t4, the master cylinder pressure Pr actually rises and exceeds a value of (control target pressure Po+predetermined value $\Delta$Pm), therefore, the ACC control unit 2 likely can release (end) the vehicle speed control (automatic cruise)and the intercar distance follow-up control.

FIG. 6 shows still another control using a variation component $\Delta$Po/$\Delta$t of the control target pressure instead of the value of (control target pressure Po+predetermined value $\Delta$Pm) as explained in connection with FIG. 5. When the driver presses the brake pedal 5 at time t4, the actual master cylinder pressure rises suddenly in a rate ($\Delta$Pr/$\Delta$t) steeper than the variation component $\Delta$Po/$\Delta$t of the control target pressure. Through comparison of these variation components it is judged that the driver has pressed the brake pedal 5, and the ACC control unit 2 can be release (end) the vehicle speed control (automatic cruise) and the intercar distance follow-up control.

Figure 7:
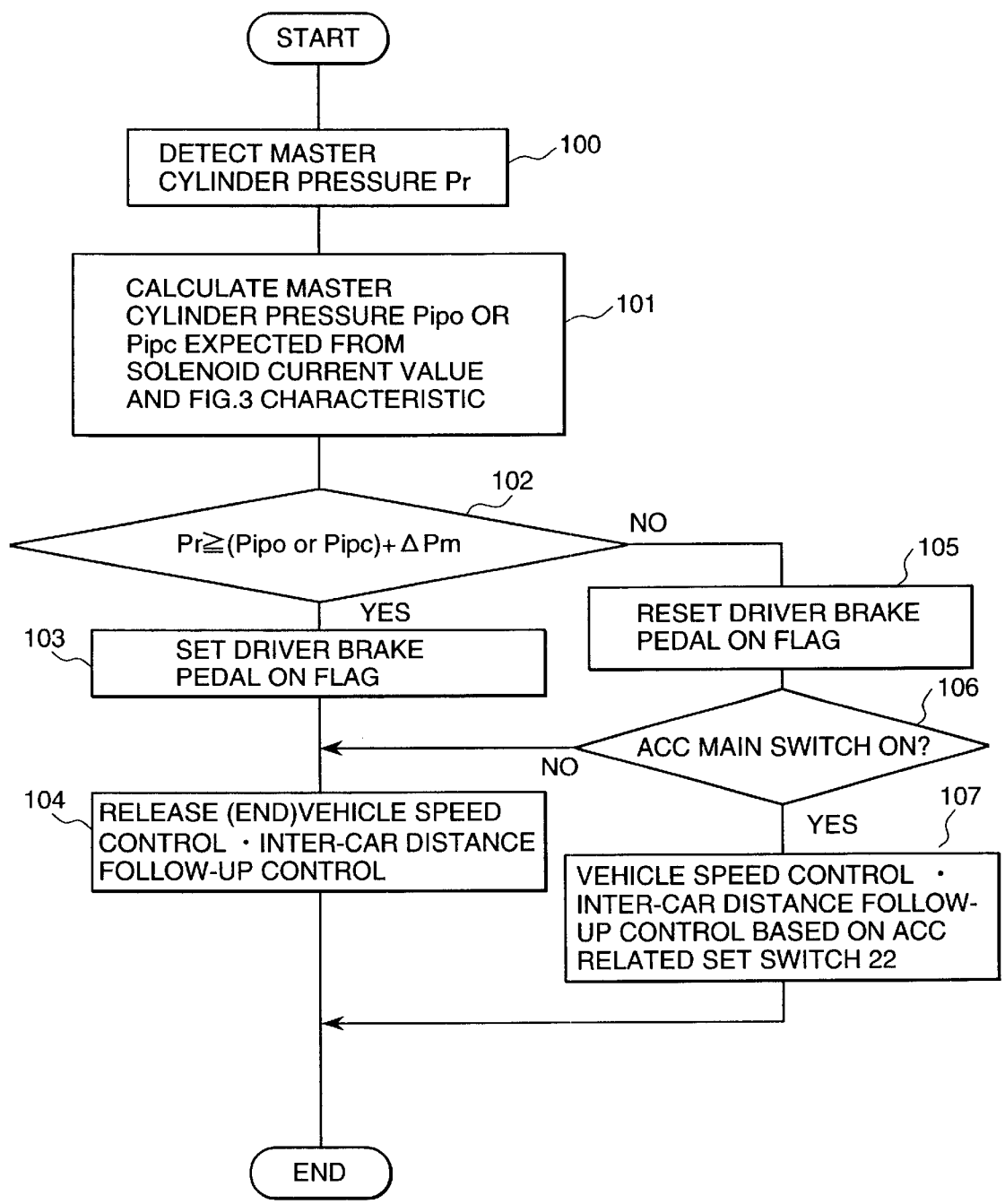
FIG. 7 is a flow chart corresponding to FIG. 4 operation explanation diagram.
Figure 8:
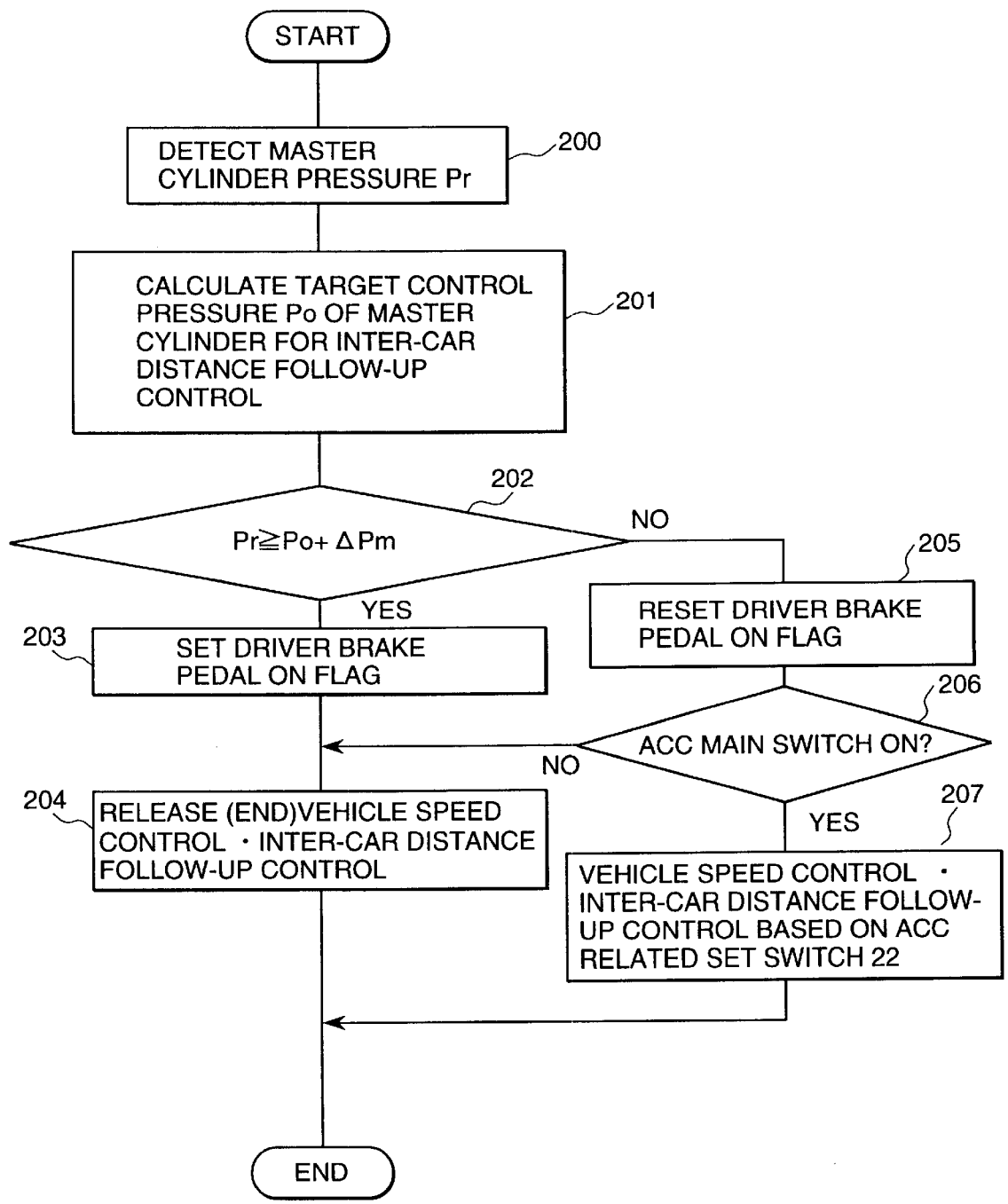
FIG. 8 is a flow chart corresponding to FIG. 5 operation explanation diagram.
Figure 9:
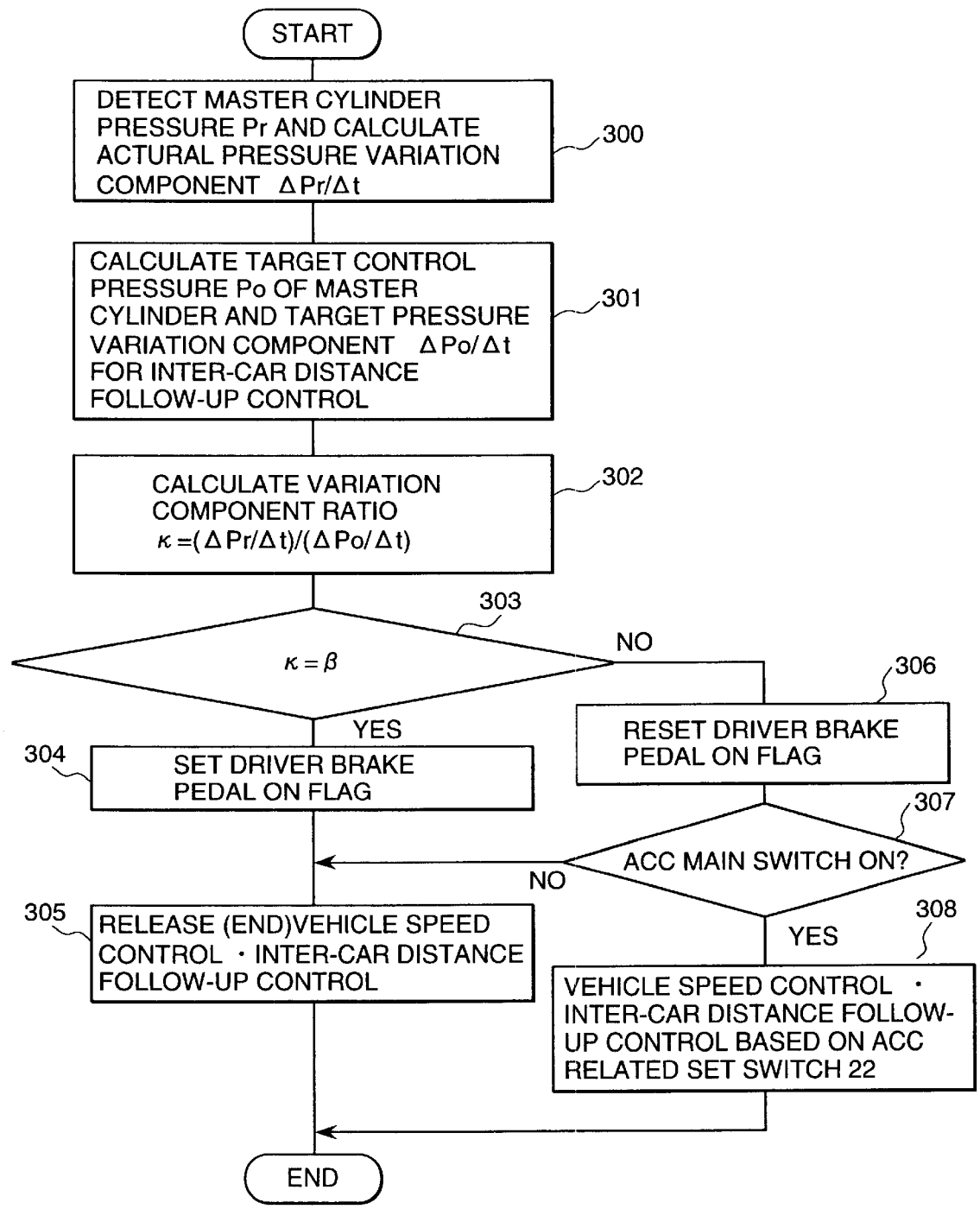
FIG. 9 is a flow chart corresponding to FIG. 6 operation explanation diagram.

FIGS. 7, 8 and 9 are respectively the flow charts corresponding to the operation explanation diagrams as shown in FIGS. 4, 5 and 6.

In FIG. 7, at step 100 the master cylinder pressure Pr is detected, and at step 101 an expected master cylinder pressure Pipo (at the time of pressure increasing) or Pipc (at the time of pressure decreasing) is calculated based on the current solenoid current value and the brake booster characteristic as shown in FIG. 3. At step 102, it is compared whether the actual master cylinder pressure Pr is larger than ((Pipo or Pipc)+$\Delta$Pm), and if the answer is YES, process advances to step 103 and judges that the driver has pressed the brake pedal 5 and sets ON flag. At step 104 based on the judgement that the brake pedal 5 has been pressed by the driver, the processing ends by releasing (ending) the vehicle speed control and the intercar distance follow-up control, if such controls are alive. When the comparison result at step 102 is NO, it is judged at step 105 that the driver has not pressed the brake pedal 5 to reset ON flag. Subsequently, it is judged whether the ACC main switch 3 is ON, and if the answer is YES, the vehicle speed control and the intercar distance follow-up control are performed at step 107 based on the ACC relating set switch 22. When the answer at step 106 is NO, the process advances to step 104 and ends the processing by releasing (ending) the vehicle speed control and the intercar distance follow-up control.

In FIG. 8, like in FIG. 7 at step 200 the master cylinder pressure Pr is detected, and at step 201 a control target pressure Po of master cylinder pressure for the intercar distance follow-up control is calculated. At step 202, it is compared whether the actual master cylinder pressure Pr is larger than (Po+$\Delta$Pm), and if the answer is YES, process advances to step 203 and judges that the driver has pressed the brake pedal and sets ON flag. At step 204 based on the judgement that the brake pedal 5 has been pressed by the driver, the processing ends by releasing (ending) the vehicle speed control and the intercar distance follow-up control, if such controls are alive. When the comparison result at step 202 is NO, it is judged at step 205 that the driver has not pressed the brake pedal 5 to reset ON flag. Subsequently, it is judged whether the ACC main switch 3 is ON, and if the answer is YES, the vehicle speed control and the intercar distance follow-up control are performed at step 207 based on the ACC relating set switch 22. When the answer at step 206 is NO, the process advances to step 204 and ends the processing by releasing (ending) the vehicle speed control and the intercar distance follow-up control.

In FIG. 9, at step 300 the master cylinder pressure Pr is detected, and actual pressure variation component $\Delta Pr/\Delta t$ is calculated. At step 301 the variation component $\Delta Po/\Delta t$ is calculated from the control target pressure Po of master cylinder pressure for the intercar distance follow-up control. At step 302 ratio $K=(\Delta Pr/\Delta t)/(\Delta Po/\Delta t)$ of the respective variation components is calculated and it is compared at step 303 whether the ratio K is larger than a predetermined value $\beta$, and if the answer is YES, process advances to step 304 and judges that the driver has pressed the brake pedal 5 and sets ON flag. At step 305 based on the judgement that the brake pedal 5 has been pressed by the driver, the processing ends by releasing (ending) the vehicle speed control and the intercar distance follow-up control, if such controls are alive. When the comparison result at step 303 is NO, it is judged at step 306 that the driver has not pressed the brake pedal 5 to reset ON flag. Subsequently, it is judged whether the ACC main switch 3 is ON, and if the answer is YES, the vehicle speed control and the intercar distance follow-up control are performed at step 308 based on the ACC relating set switch 22. When the answer at step 307 is NO, the process advances to step 305 and ends the processing by releasing (ending) the vehicle speed control and the intercar distance follow-up control.

As has been explained hitherto, according to the present invention, based on at least one of when an output (master cylinder pressure) larger by a predetermined amount than an output (master cylinder pressure) expected from a current applied to the solenoid 6 in the brake booster 4 is obtained, when an output (master cylinder pressure) larger by a predetermined amount than a control target output (target master cylinder pressure) is obtained and when an output variation larger by a predetermined amount in an increasing direction than a variation component of the control target output (target master cylinder pressure) is obtained, it is judged that the driver has pressed the brake pedal, and the vehicle speed control or the intercar distance follow-up control is released, thereby, a stroke sensor and a brake pedal pressing force sensor are unnecessitated. As a result, the structure of the booster is simplified and the attachment work and the attachment position adjustment work for the stroke sensor and the brake pedal pressing force sensor are eliminated.

What is claimed is:

1. A brake booster control device provided with at least a function of outputting an amplified output based on an input from a brake pedal and a control function which increases or decreases the amplified output by acting an electromagnetic force to a control valve, characterized in that the brake booster control device further comprises a function of judging that a driver has pressed the brake pedal based on at least one of when an output larger by a predetermined amount than an output which is expected from a control amount applied to the control valve is obtained, when an output larger by a predetermined amount than a control target output is obtained and when an output variation larger in its increasing direction by a predetermined amount than a variation component of a control target output is obtained, wherein the output expected from the control amount applied to the control valve is calculated, based on different characteristic values including hysteresis characteristic depending on output increasing period and output decreasing period and it is judged that the driver has pressed the brake pedal when a value determined by adding a predetermined value to the calculated value exceeds the actual output.

2. A brake booster control device according to claim 1, wherein the respective outputs are master cylinder pressure.

3. A brake booster control device provided with at least a function of outputting an amplified output based on an input from a brake pedal and a control function which increases or decreases the amplified output by acting an electromagnetic force to a control valve, characterized in that the brake booster control device releases a vehicle speed control or an intercar distance follow-up control based on at least one of when an output larger by a predetermined amount than an output which is expected from a control amount applied to a control valve is obtained, when an output larger by a predetermined amount than a control target output is obtained and when an output variation larger in its increasing direction by a predetermined amount than a variation component of a control target output is obtained, wherein the output expected from the control amount applied to the control valve is calculated, based on different characteristic values including hysteresis characteristic depending on output increasing period and output decreasing period and the vehicle speed control or the intercar distance follow-up control is released when a value determined by adding a predetermined value to the calculated value exceeds the actual output.

4. A brake booster control device according to claim 3, wherein the respective outputs are master cylinder pressure.

5. A control method of a brake booster control device provided with at least a function of outputting an amplified output based on an input from a brake pedal and a control function which increases or decreases the amplified output by acting an electromagnetic force to a control valve, characterized in that the control method of a brake booster control device further comprises a function of judging that a driver has pressed the brake pedal based on at least one of when an output larger by a predetermined amount than an output which is expected from a control amount applied to the control valve is obtained, when an output larger by a predetermined amount than a control target output is obtained and when an output variation larger in its increasing direction by a predetermined amount than a variation component of a control target output is obtained, wherein the output expected from the control amount applied to the control valve is calculated, based on different characteristic values including hysteresis characteristic depending on output increasing period and output decreasing period and it is judged that the driver has pressed the brake pedal when a value determined by adding a predetermined value to the calculated value exceeds the actual output.

6. A control method of a brake booster control device according to claim 5, wherein the respective outputs are master cylinder pressure.

7. A control method of a brake booster control device provided with at least a function of outputting an amplified output based on an input from a brake pedal and a control function which increases or decreases the amplified output by acting an electromagnetic force to a control valve, characterized in that the control method of a brake booster control device releases a vehicle speed control or an intercar distance follow-up control based on at least one of when an output larger by a predetermined amount than an output which is expected from a control amount applied to a control valve is obtained, when an output larger by a predetermined amount than a control target output is obtained and when an output variation larger in its increasing direction by a predetermined amount than a variation component of a control target output is obtained, wherein the output expected from the control amount applied to the control valve is calculated, based on different characteristic values including hysteresis characteristic depending on output increasing period and output decreasing period and the vehicle speed control or the intercar distance follow-up control is released when a value determined by adding a predetermined value to the calculated value exceeds the actual output.

8. A control method of a brake booster control device according to claim 7, wherein the respective outputs are master cylinder pressure.

* * * * *